(12) United States Patent  (10) Patent No.: US 7,484,784 B2
Ohly  (45) Date of Patent: Feb. 3, 2009

(54) SELECTIVELY REMOVABLE TAILGATE HINGE FOR A POWER TAILGATE

(75) Inventor: Benjamin G. Ohly, Farmington, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 289 days.

(21) Appl. No.: 11/513,864

(22) Filed: Aug. 31, 2006

(65) Prior Publication Data

US 2008/0054667 A1    Mar. 6, 2008

(51) Int. Cl.
B62D 33/03    (2006.01)

(52) U.S. Cl. ........................................ 296/57.1; 296/50

(58) Field of Classification Search ................... 296/50, 296/52, 53, 57.1
See application file for complete search history.

(56) References Cited

U.S. PATENT DOCUMENTS

| | | | |
|---|---|---|---|
| 5,154,565 A | 10/1992 | Bourgeois | |
| 5,449,212 A | 9/1995 | Seifert | |
| 6,068,321 A | 5/2000 | Ooms | |
| 6,196,609 B1 | 3/2001 | Bowers | |
| 6,217,097 B1 | 4/2001 | Rogers, Jr. et al. | |
| 6,276,743 B1 | 8/2001 | Jyawook et al. | |
| 6,297,605 B1 | 10/2001 | Butler et al. | |
| 6,357,813 B1 | 3/2002 | Vandeberghe et al. | |
| 6,588,151 B1 | 7/2003 | Goscicki et al. | |
| 6,637,796 B1 * | 10/2003 | Westerdale et al. | 296/57.1 |
| 6,719,356 B2 | 4/2004 | Cleland et al. | |
| 6,773,047 B2 | 8/2004 | Gruber | |
| 6,777,958 B2 | 8/2004 | Haag et al. | |
| 6,793,264 B1 | 9/2004 | Muller et al. | |
| 7,219,945 B1 | 5/2007 | Zinn et al. | |
| 7,320,497 B2 | 1/2008 | Zinn et al. | |
| 2001/0033091 A1 | 10/2001 | Rogers, Jr. et al. | |
| 2003/0115801 A1 | 6/2003 | Goscicki et al. | |
| 2004/0032141 A1 | 2/2004 | Moyna | |
| 2004/0108743 A1 | 6/2004 | Gruber | |
| 2006/0131915 A1 | 6/2006 | Ogino et al. | |
| 2007/0035156 A1 | 2/2007 | Compton et al. | |
| 2007/0132264 A1 * | 6/2007 | Koneval et al. | 296/57.1 |

* cited by examiner

*Primary Examiner*—Lori L Lyjak
(74) *Attorney, Agent, or Firm*—Global IP Counselors, LLP

(57) ABSTRACT

A selectively detachable tailgate assembly for a vehicle is disclosed. The tailgate assembly includes a tailgate, a hinge mechanism, and a power assembly. The hinge mechanism connects the tailgate to a portion of a vehicle. A portion of the hinge mechanism may be selectively disassembled to permit the tailgate to be removed from the vehicle. The power assembly is operatively connected to the tailgate to provide power to the tailgate to selectively move the tailgate at least partially between the open and closed positions.

20 Claims, 9 Drawing Sheets

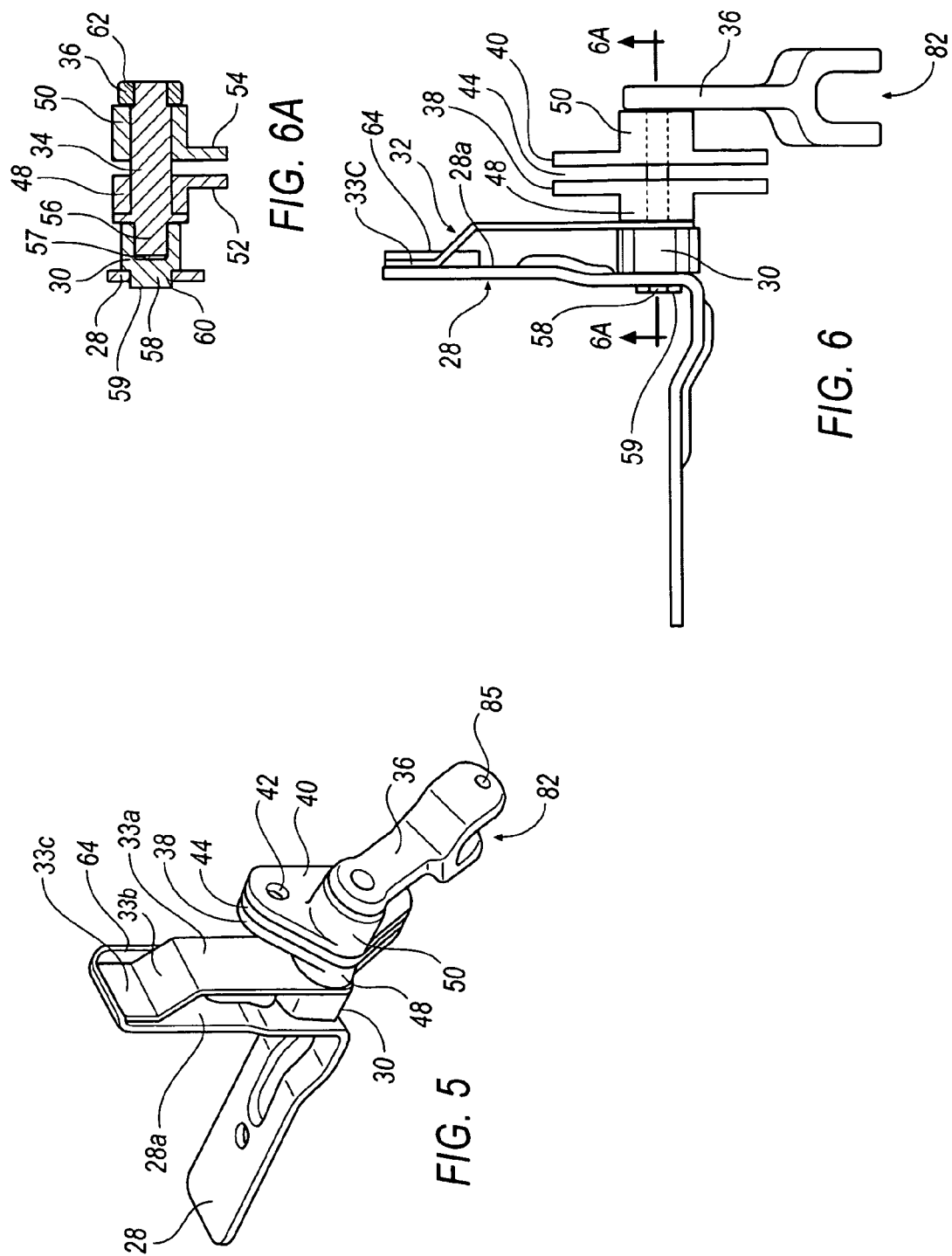

US 7,484,784 B2

SELECTIVELY REMOVABLE TAILGATE HINGE FOR A POWER TAILGATE

TECHNICAL FIELD

Described herein is an illustrative selectively removable tailgate hinge for a motor vehicle.

BACKGROUND

Various types of motor vehicles, such as pickup trucks and SUTs (sport utility trucks), are provided with tailgates that provide access to cargo beds. The tailgates for these vehicles are often hinged at the bottom of the tailgate and operatively connected to the rear end of the cargo bed. To access the cargo bed, tailgates may be opened and closed, either manually or by a power control apparatus. When in the closed position, the tailgate is secured to the cargo bed using latches on lateral ends of the tailgate that operatively engage with striker pins extending from sidewalls of the cargo bed. To insure that the latches properly engage the striker pins, it is often necessary to exert a large amount of force to lift the tailgate into the closed position and proper engagement.

In some instances, it may be desirable to selectively remove the tailgate from the vehicle. However, with conventional hinge mechanisms, removal of the tailgate requires specific tools and removal is often cumbersome, especially for tailgates that are connected to a power control apparatus. Accordingly, there is a need for tailgate hinge mechanism that may be used to selectively remove the tailgate from a vehicle with minimal effort and that may be suitable for use with a power control apparatus.

SUMMARY

In an exemplary embodiment, a selectively removable tailgate assembly for a vehicle comprises a tailgate that is movable between an open position and a closed position, a hinge mechanism, and a power assembly. The hinge mechanism connects the tailgate to a portion of the vehicle. At least one portion of the hinge mechanism may be selectively detached from another portion of the hinge mechanism to permit the tailgate to be removed from the vehicle. The power assembly operatively connects to the tailgate hinge mechanism to selectively move the tailgate at least partially between the open and closed positions.

BRIEF DESCRIPTION OF THE DRAWINGS

The features and inventive aspects of the present invention will become more apparent from the following detailed description, the appended claims, and the accompanying drawings, of which the following is a brief description:

FIG. 5 is a perspective view of the hinge mechanism of FIG. 4 removed from the tailgate.

FIG. 6 is a side elevational view of the hinge mechanism of FIG. 5.

FIG. 6A is a cross-sectional view of the hinge mechanism taken along lines 6A-6A of FIG. 6.

DETAILED DESCRIPTION

Figure 1:
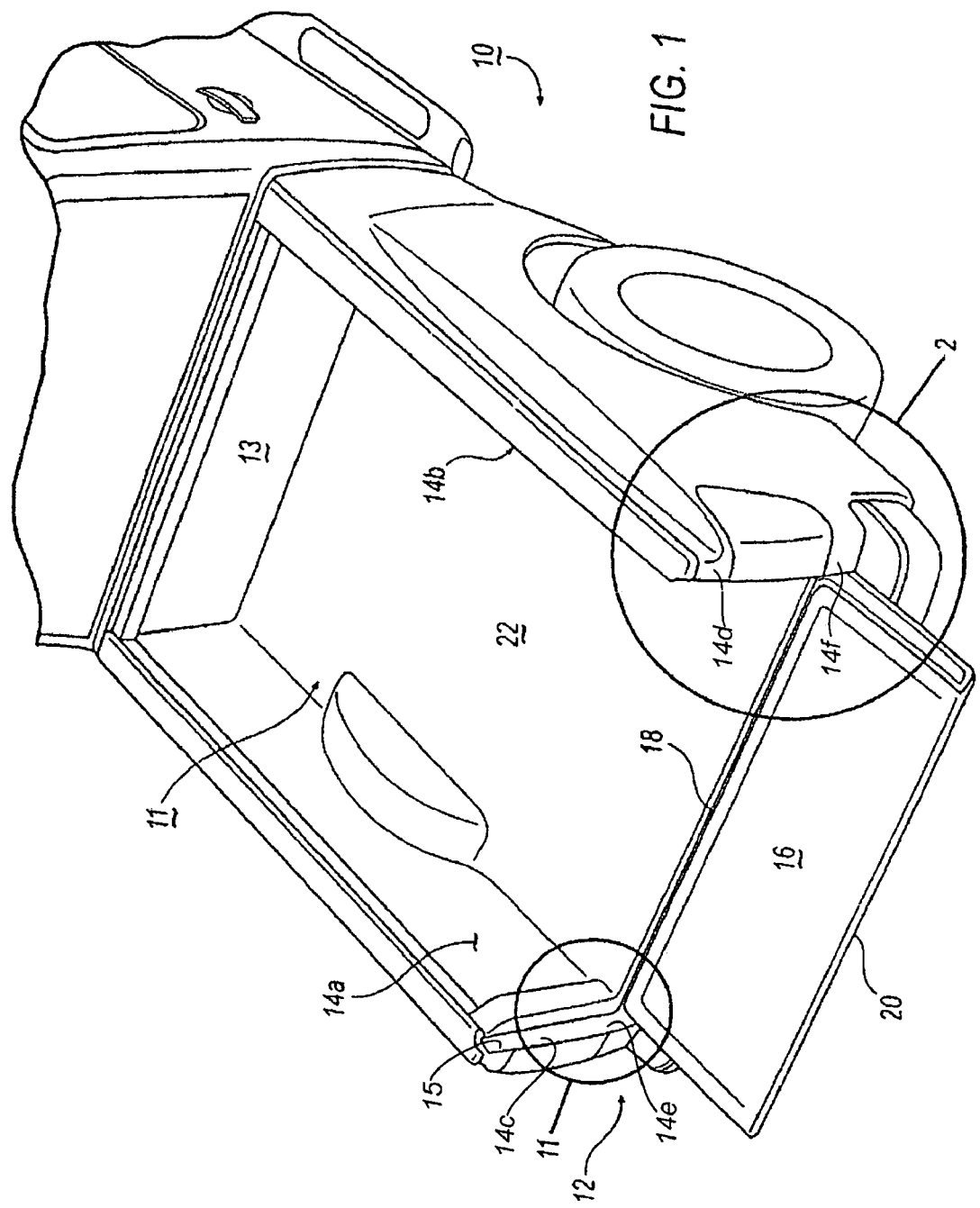
FIG. 1 is a perspective view of the rear end of a vehicle equipped with an embodiment of a selectively removable power tailgate assembly.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of a power tailgate assembly of the present invention will now be described in connection with its use on a vehicle.

Figure 2:
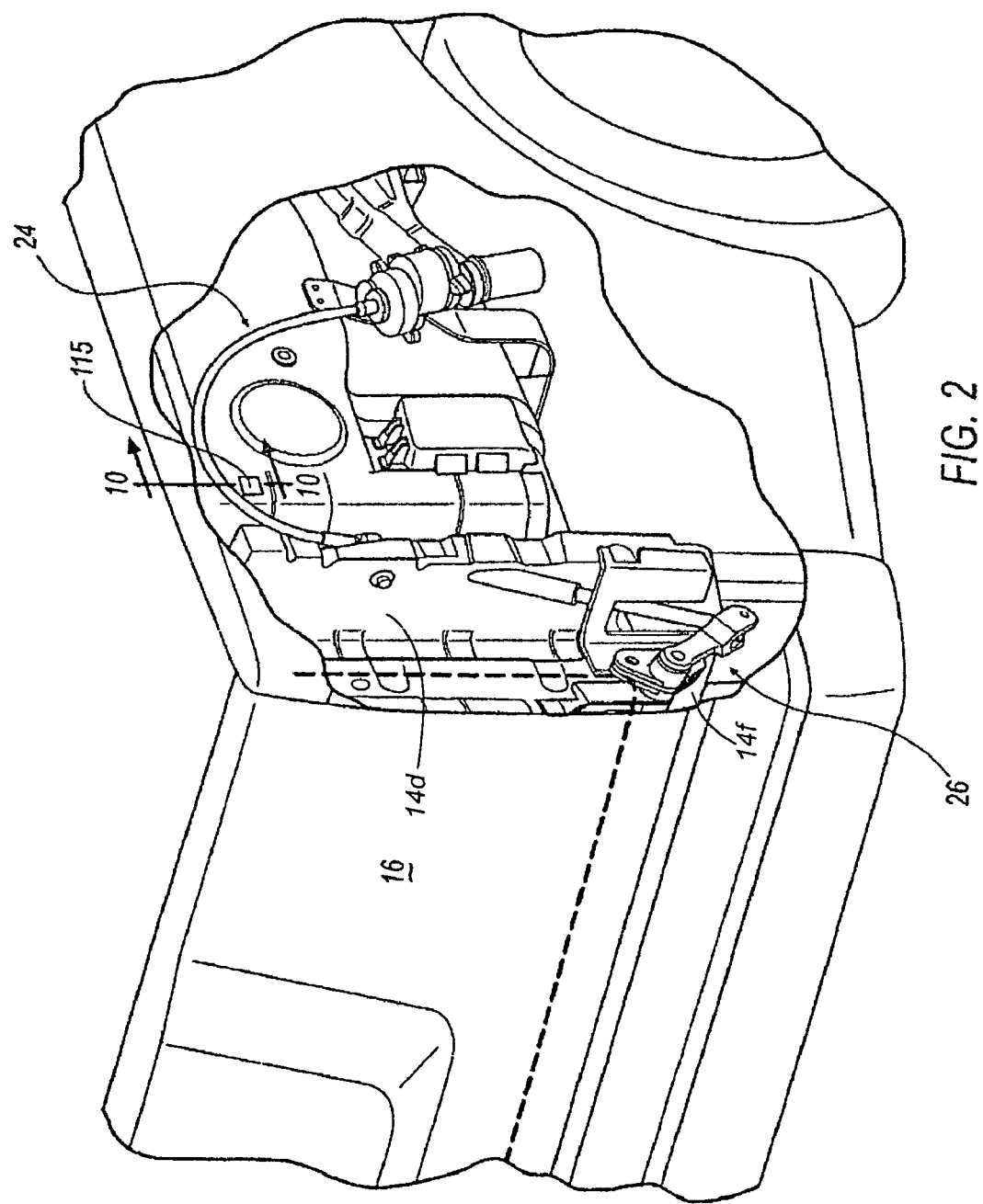
FIG. 2 is a perspective view of the selectively removable power tailgate assembly from area 2 in FIG. 1.
Figure 3:
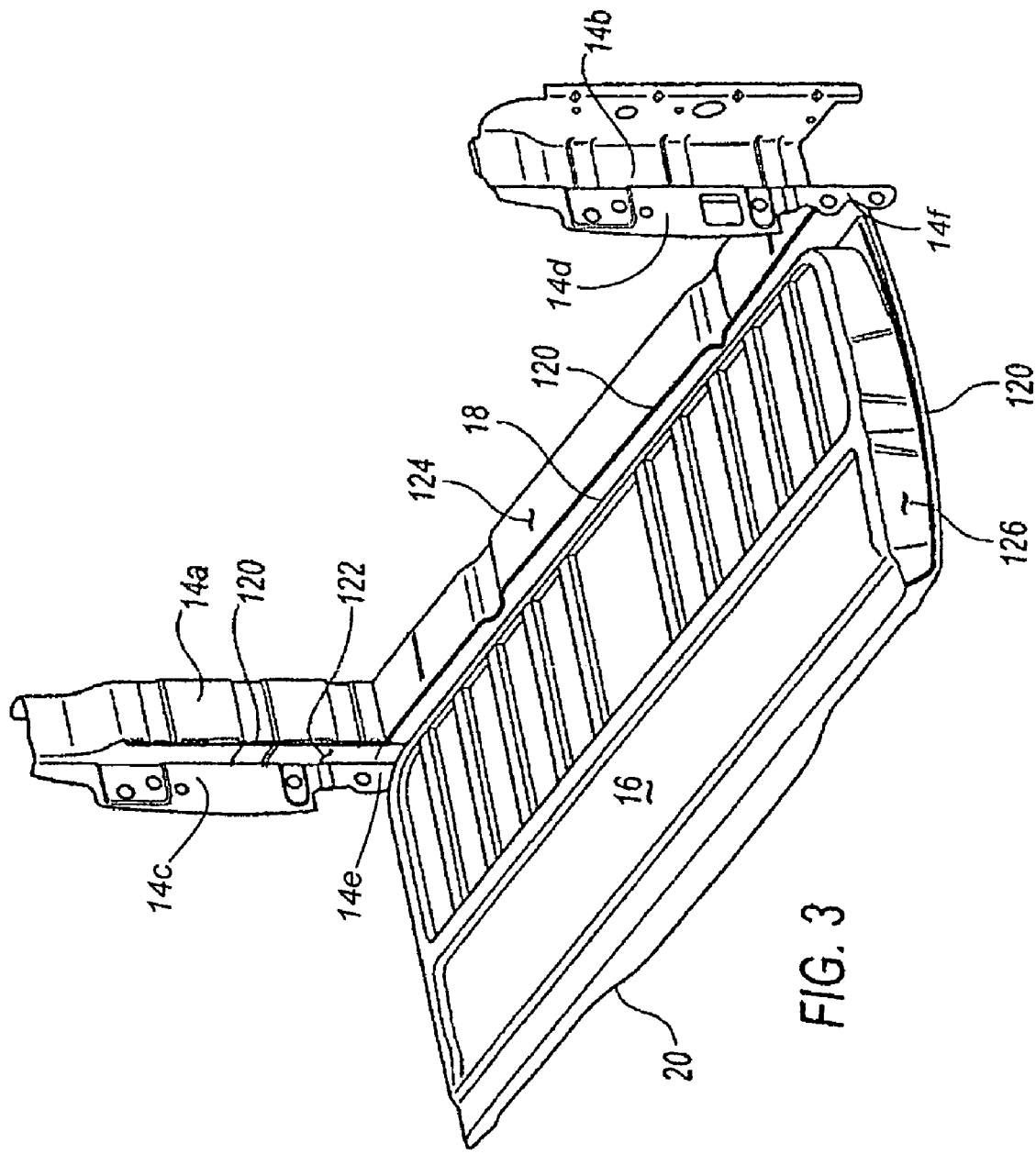
FIG. 3 is a perspective view of the tailgate assembly of FIG. 1.

Referring to FIG. 1, there is shown a vehicle 10 having a cargo bed 11 (a cargo area). The cargo bed 11 is generally defined by a floor portion 22, a front wall 13, two laterally spaced side walls 14a, 14b and a selectively movable tailgate 16. The side wall 14a includes a rearward end 14c and the side wall 14b includes a rearward end 14d. The rearward end 14c and the rearward end 14d define a tailgate opening 15. Tailgate 16 includes a first end 18 and a second end 20. The first end 18 of tailgate 16 is hingedly connected to a portion of a rear end 12 of the vehicle between the rearward ends 14c and 14d. Tailgate 16 is movable between a closed position and an open position such that in the closed position, the tailgate 16 mates with the tailgate opening 14 and the rearward ends 14c and 14d of the first and second side cargo walls 14a and 14b, as indicated in FIG. 2. When tailgate 16 is in the closed position, tailgate 16 is generally perpendicular to the floor portion 22. A latching mechanism (not shown) is provided on tailgate 16 to secure tailgate 16 in the closed position. When the tailgate 16 is in the open position, the tailgate is generally coplanar with the floor portion 22, thereby extending the floor portion 22 of the cargo bed 11, as shown in FIG. 1.

Figure 11:
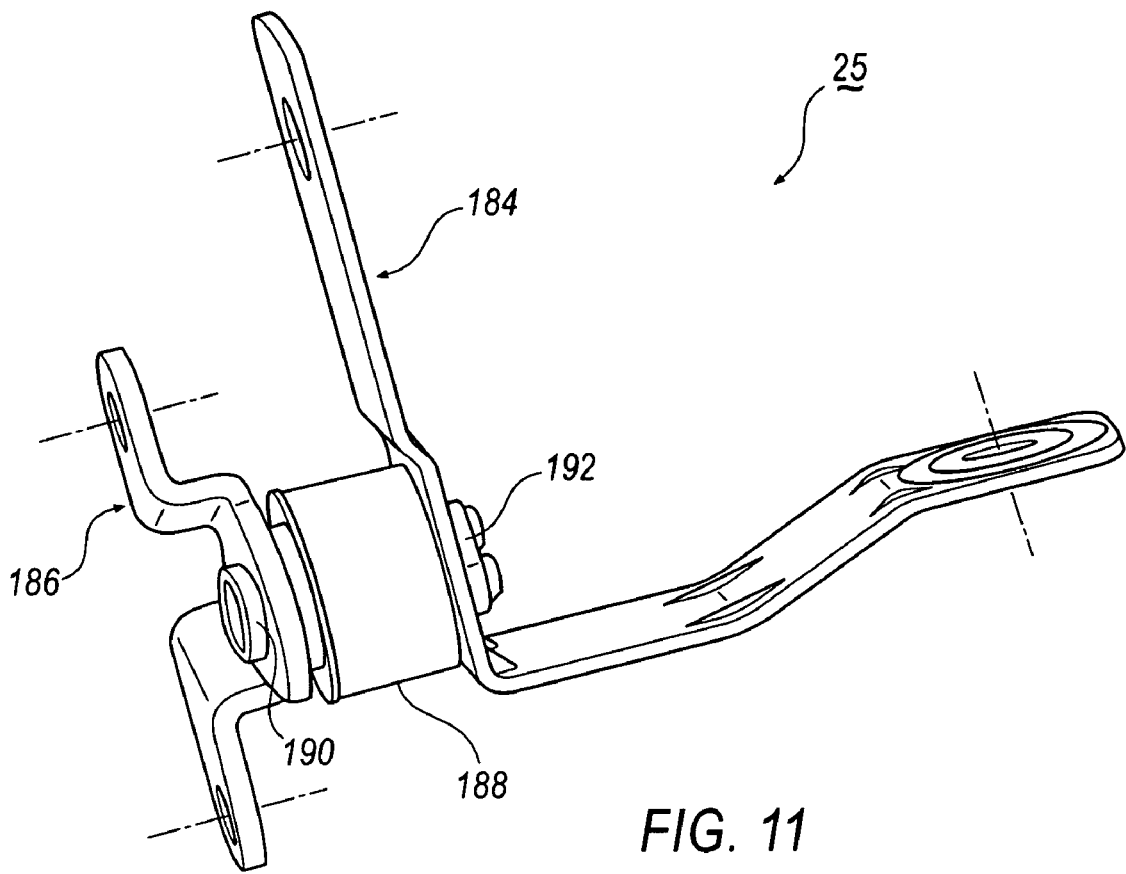
FIG. 11 is a perspective view of a hinge mechanism that is not connected to the power assembly.

As seen in FIG. 2, tailgate 16 is hingedly connected to a vehicle by a pair of selectively removable hinge mechanisms 25 and 26. The hinge mechanisms 25 and 26 disconnectably connect the tailgate 16 to lower portion 14e of rearward end 14c of the first side cargo wall 14a and a lower portion 14f of the rearward end 14d of the second side cargo wall 14b, as indicated in FIGS. 1-4. First hinge mechanism 25 (as best seen in FIG. 11) is a conventional disconnectable hinge mechanism that is used with tailgates that are manually moved between the open and closed positions. First hinge mechanism 25 will be described in further detail below.

Figure 4:
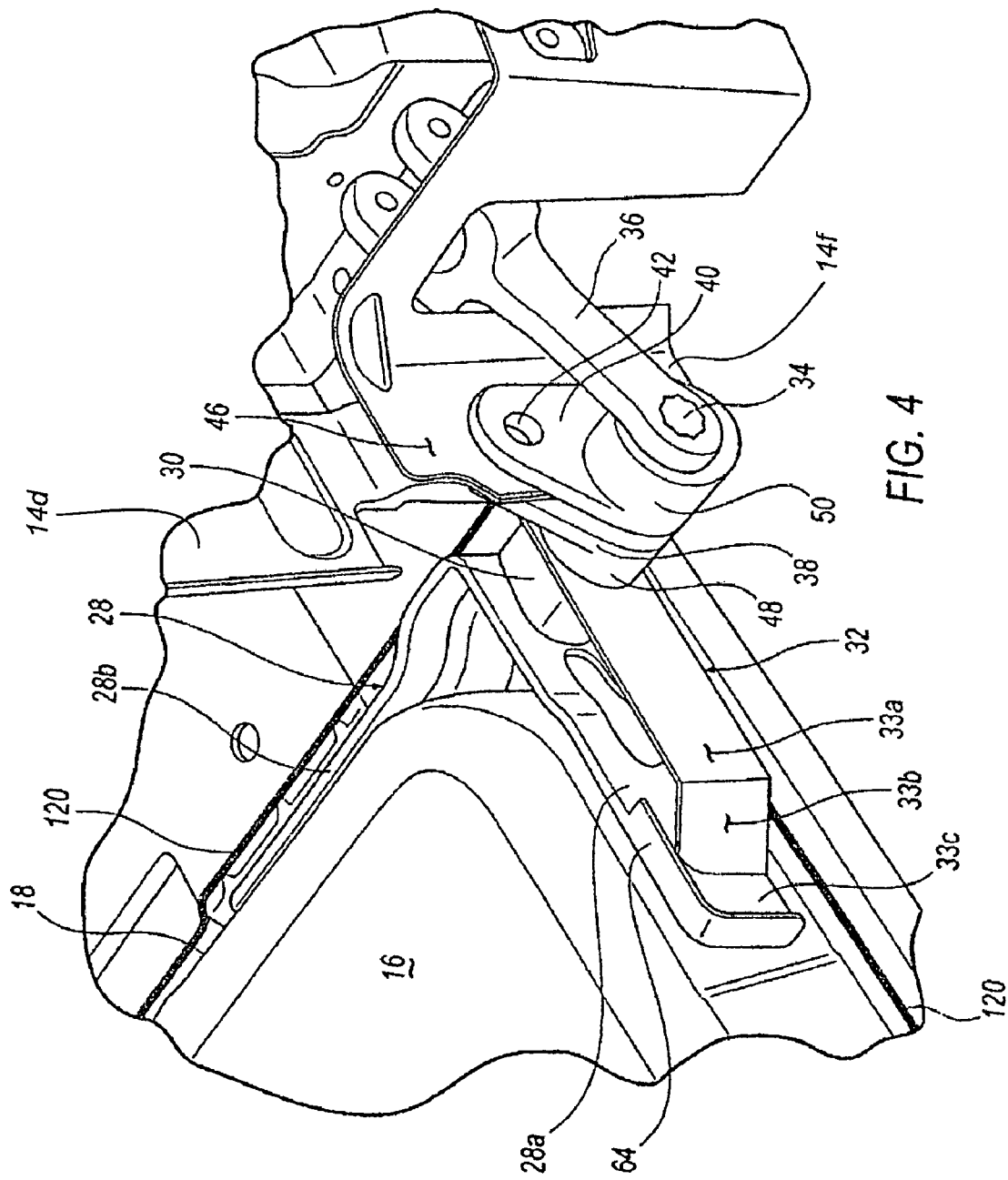
FIG. 4 is an enlarged perspective view of a hinge mechanism for the selectively removable power tailgate assembly of FIG. 1.

Second hinge mechanism 26 (which is best seen in FIGS. 4-6) is connected to a power assembly 24 and includes a tailgate bracket 28, a drive cup 30, and a lever arm 32. In one embodiment, tailgate bracket 28 is generally L-shaped and is positioned with a first leg 28a secured to a side edge of tailgate 16 and second leg 28b secured to a first end 18 of tailgate 16. Power assembly 24 (to be explained further below) serves to open and close tailgate 16.

Lever arm 32 comprises a body portion 33a, a leg portion 33b, and a foot portion 33c. The body portion 33a further includes a driveshaft 34 (an example of which may be seen in FIG. 6A) that operatively connects to a clevis 36. Leg portion 33b connects foot portion 33c to body portion 33a. Foot portion 33c and body portion 33a are generally parallel to one another, with leg portion 33b being angled outwardly so as to space foot portion 33c a predetermined distance inboard from body portion 33a.

Hinge mechanism 26 may further include one or more support brackets for attaching hinge mechanism 26 to a vehicle frame. As shown in FIG. 4, in one embodiment, hinge mechanism 26 includes an inner support bracket 38 and an outer support bracket 40. Inner and outer support brackets 38 and 40 are received on driveshaft 34 and further include one or more attachment openings 42. Inner and outer support brackets 38 and 40 are assembled so as to form a small gap 44 (best seen in FIG. 5) therebetween. Gap 44 receives a portion of a vehicle body structure 46 (best seen in FIGS. 4 and 6) therein. A fastening element, such as a screw and nut assembly for example, engages attachment openings 42 to secure inner and outer support brackets 38 and 40 to vehicle body structure 46.

In one embodiment, inner and outer support brackets 38 and 40 further include outwardly extending collars 48 and 50. Collars 48 and 50 are oriented so as to extend from an outside surface 52 and 54 of inner and outer support brackets 38 and 40. Collars 48 and 50 may further be equipped with bearing sleeves (not shown) that receive driveshaft 34 to insure that driveshaft 34 rotates independent of support brackets 38 and 40. In one embodiment, collars 48 and 50 are integral with support brackets 38 and 40.

To assemble hinge mechanism 26, an outwardly extending plug member 56 of lever arm 32 (see FIG. 6A), is press-fit into a mounting groove 57 formed in drive cup 30. Drive cup 30 further includes an outwardly extending boss 58 that is received for frictional engagement within an aperture 60 formed in tailgate bracket 28 such that a portion of boss 58 extends through aperture 60, as best seen in FIGS. 6 and 6A.

Foot portion 33c is positioned in contact with first leg 28a of tailgate bracket 28. Driveshaft 34, which is attached to lever arm 32, is positioned through support brackets 38 and 40 and an aperture 62 formed in a portion of clevis 36. A distal end of driveshaft 34 is keyed and received in aperture 62 which is correspondingly keyed such that driveshaft 34 will rotate in response to movement by clevis 36. As clevis 36 drives driveshaft 34, lever arm 32 will also rotate. Further, foot portion 33c of lever arm 32 will contact a flange 64 formed on first leg 28a of tailgate bracket 28, thereby lifting tailgate 16. This arrangement reduces torque on drive cup 30.

Figure 7:
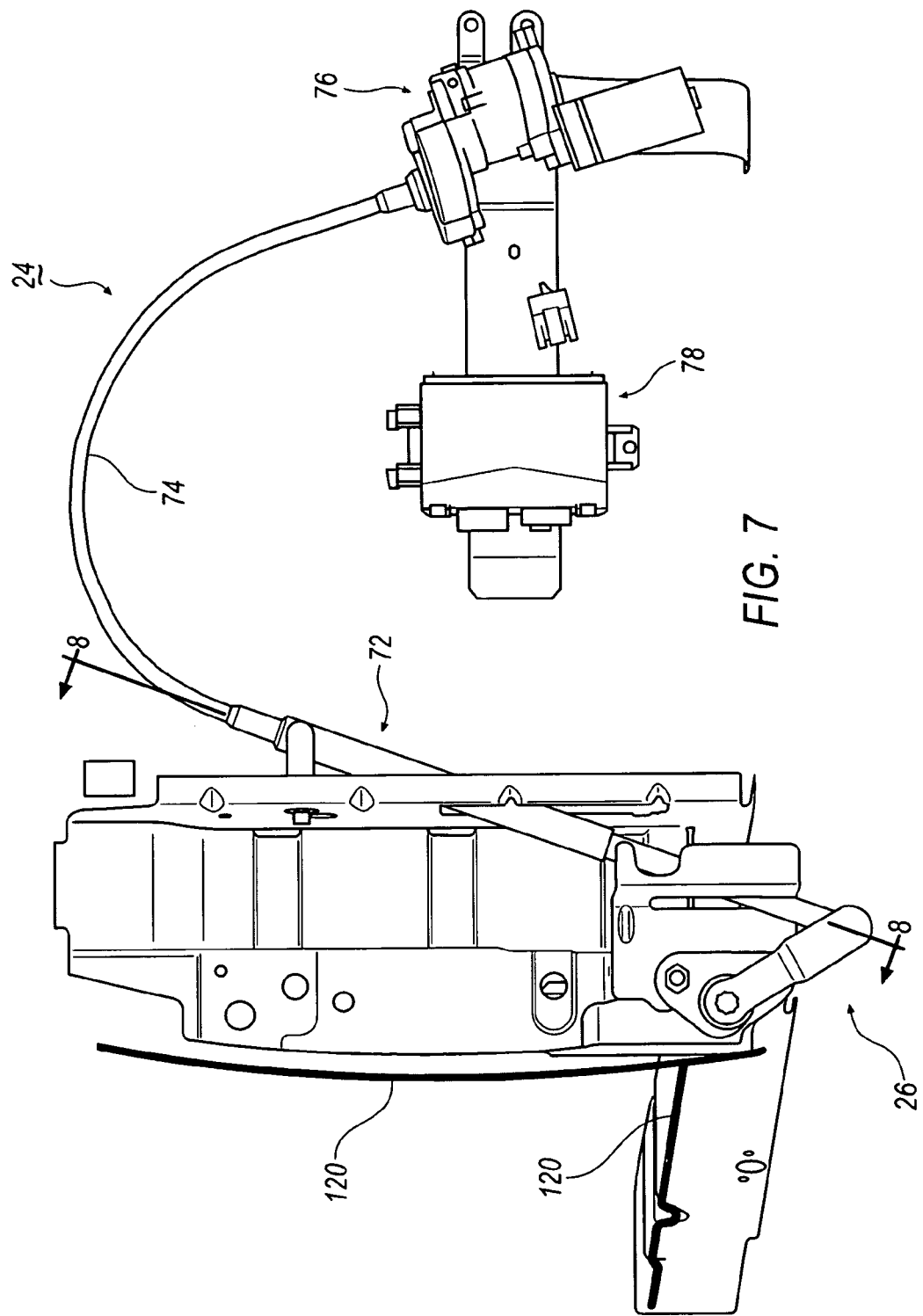
FIG. 7 is an enlarged elevational view of a power assembly of FIG. 1.

As can be seen in FIGS. 2 and 7, hinge mechanism 26 is operatively connected to power assembly 24. In one embodiment, power assembly 24 includes a screw assembly 72 that is connected to a wire cable 74. A motor assembly 76 operates the screw assembly 72. A controller 78 controls motor assembly 76. Power assembly 24 serves a number of functions. For example, power assembly provides power to tailgate 16 to engage the latching mechanism (not shown) that secures tailgate 16 to a portion of vehicle 10. Power assembly 24 also operates hinge mechanism 26 to effect opening and closing of tailgate 16. Power assembly 24 also provides power to pinch strips (to be discussed below in further detail) to modify operation of tailgate 16 in the event of an obstruction in the path of tailgate 16.

Figure 8:
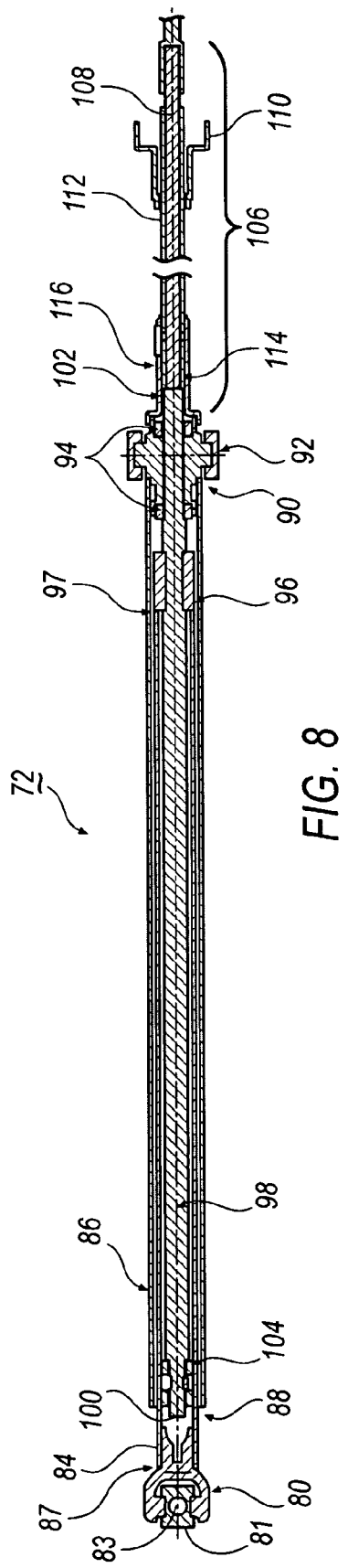
FIG. 8 is a cross-sectional view of an embodiment of a screw assembly for the power assembly taken along lines 8-8 of FIG. 7.

Screw assembly 72 is shown in greater detail in FIG. 8. Screw assembly 72 includes a mounting assembly 80 that includes a mounting element 81 having a mounting aperture 83 extending therethrough. Mounting element 81 is received a generally U-shaped fork mount 82 (see FIG. 5) of clevis 36. Mounting aperture 83 aligns with corresponding mounting apertures 85 that are positioned in each arm of fork mount 82. A connection mechanism, such as a screw, is inserted through aligned mounting apertures 83 and 85 to connect mounting assembly 80 to clevis 36.

Screw assembly 72 further includes an inner tube member 84 and an outer tube member 86. A first end 87 of inner tube member 84 is connected to mounting assembly 80. Inner tube member 84 is received within outer tube member 86 for slidable movement therein such that inner tube member 84 slides out of an opening of outer tube member 86 at one end 88 of outer tube member 86. A second end 90 of outer tube member 86 is connected to a joint housing assembly 92. Joint housing assembly 92 includes ball thrust bearings 94.

A channel nut assembly 96 is attached to a second end 97 of inner tube member 84. Received within inner tube member 84 is a lead screw 98. Lead screw 98 includes a first end 100 and a second end 102. First end 100 engages a stopper 104 that is positioned within inner tube member 84. Second end 102 extends through ball thrust bearings 94 and joint housing assembly 92.

Positioned adjacent to second end 102 is a cable assembly 106. Cable assembly 106 includes an actuating cable 108 that is operatively connected to motor assembly 76 via a first mounting flange 110. Cable 108 is disposed in a casing 112. One end 114 of cable 108 is retained within a second mounting flange 116. Second mounting flange 116 connects to joint housing assembly 92. End 114 is operatively connected to second end 102 of lead screw 98.

Figure 10:
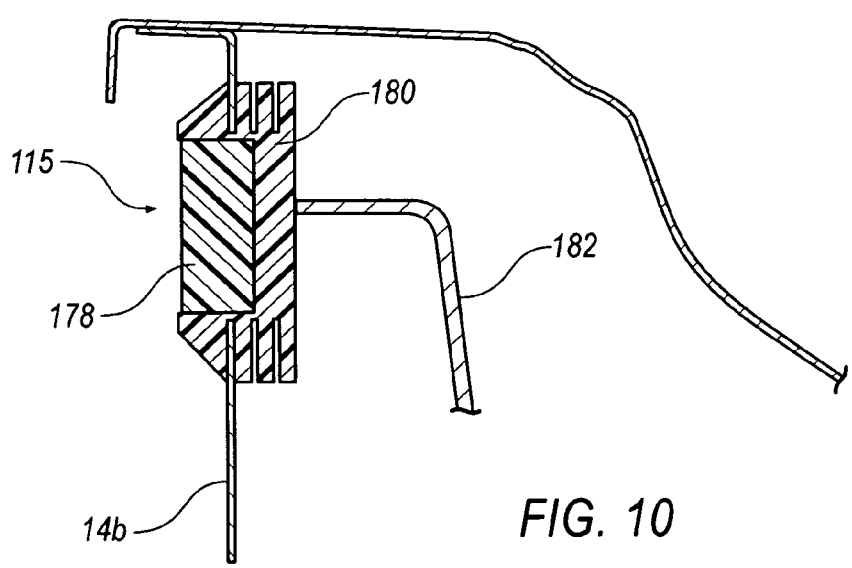
FIG. 10 is a cross-sectional view of a tailgate switch taken along lines 10-10 of FIG. 2.

In operation, a switch 115, which may be located on an interior lateral wall 14b of vehicle 10 (as shown in FIG. 10 and to be discussed in further detail below), an interior of vehicle 10, or on a key fob; sends a signal to controller 78 to move tailgate 16. If tailgate 16 is in the open position, controller 78 causes motor assembly 76 to actuate cable 108 in a forward direction so as to push lead screw 98 forward, which, in turn, moves lead screw 98 into contact with mounting assembly 80. Mounting assembly 80, which is connected to clevis 36, drives clevis 36 downward, thereby activating hinge mechanism 26 so as to raise tailgate 16 into a closed position (see FIG. 2), whereby the latching mechanism (not shown) will then be engaged.

To lower tailgate 16 into an open position (see FIGS. 1 and 4, e.g.), switch 115 is actuated to release the latch mechanism and motor assembly 74 is activated to retract cable 108, thereby retracting lead screw 98, such that clevis 36 is rotated upwardly. Clevis 36 thereby activates hinge mechanism 26 such that tailgate 16 is lowered.

In the above embodiment, the latching mechanism is released and engaged via switch 115. In another embodiment, the latching mechanism is manually released and tailgate 16 is manually rotated to a predetermined angle upon which screw assembly 72 will engage hinge mechanism 24 to permit tailgate 16 to be lowered into the open position.

Controller 78 may further be programmed to limit or prevent operation of power assembly 26 under certain conditions. For example, controller may be programmed to prohibit movement of tailgate 16 from the closed position when vehicle 10 is in a driving mode. Controller 78 may also be programmed to prohibit movement of tailgate 16 if tailgate is in a locked state. Further, controller 78 may also be programmed to provide an indicator (such as a light on the dash panel or an audible sound) to a driver upon start of vehicle 10 if tailgate 16 is in the open position.

Figure 9:
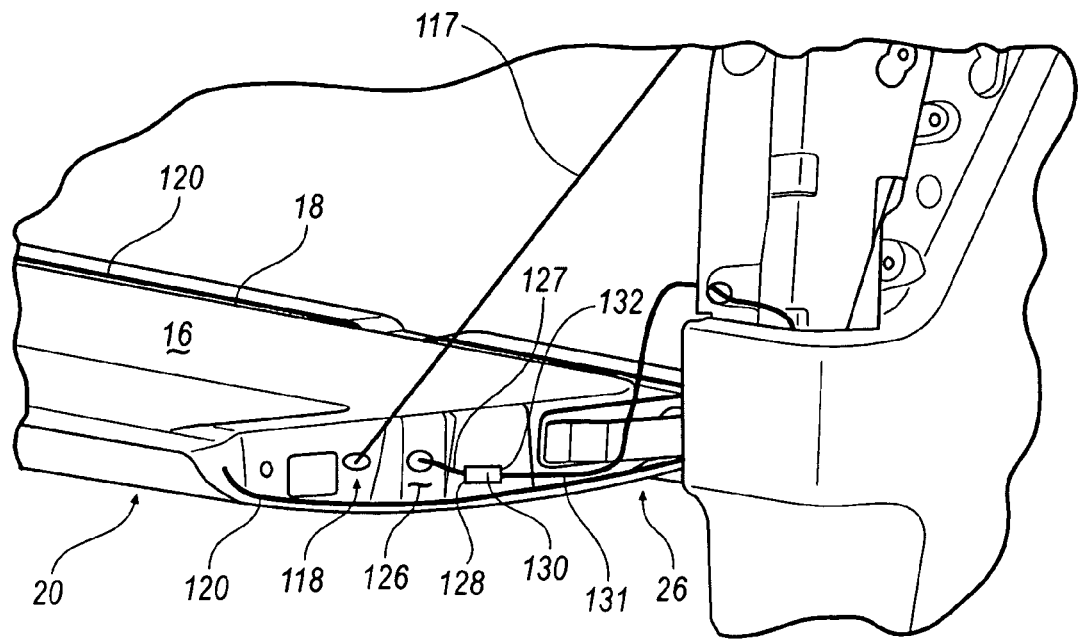
FIG. 9 is an embodiment of a detachable power source for the selectively detachable power tailgate assembly.

Tailgate 16 may optionally include a tailgate cable 117 (as best seen in FIG. 9). Tailgate cable 117 may be a stainless steel cable that may further include a protective sleeve thereon to prevent potential damage to tailgate cable 117. Tailgate cable 117 has a first end 118 that is connected to tailgate 16 closer to second end 20 than first end 18 of tailgate 16. A second end (not shown) is connected to lateral wall 14b. In some embodiments, a pair of tailgate cables 117 may be provided on either side of tailgate 16. When tailgate 16 is in the open position, tailgate cable 117 may partially support tailgate 16 in that position and/or as a fail/safe against potential failure of hinge mechanism 26. Further, tailgate cable 117 has a predetermined length so as to limit how far tailgate 16 may open. It is desired that at least one end of tailgate cable 117 may be selectively disengaged such that tailgate 16 may be selectively removable from vehicle 10.

Vehicle 10 and tailgate 16 may further be equipped with one or more sensors to detect whether or not an obstruction is present that may impede proper closing of tailgate 16. The sensors (as well as the latching mechanism of tailgate 16) are in electrical communication with controller 78. Based on signals received from the sensors, controller 78 may stop motor assembly 76 from continuing with moving tailgate 16 into the closed position or instruct motor assembly 76 to return tailgate 16 into the open position.

In one embodiment, pinch strips 120 serve as the sensors that are in electrical communication with controller 78. As may be seen, for example, in FIG. 3, pinch strips 120 are generally disposed along a contact surface 122, 124, and 126 of walls 14a, 14b, cargo bed 22, and tailgate 16, respectively. When controller 78 activates motor assembly 76 to move tailgate from an open position to a closed position, the pinch strips 120 are utilized to sense if an obstruction is present. If an obstruction is present, controller 78 will stop motor assembly 76 from continuing moving tailgate 16 into the closed position. Controller 78 may also be programmed to automatically return tailgate 16 to the open position when an obstruction is present. Thus, motor assembly 76 is protected from abusive loading and damage due to the presence of an obstruction, and a user is also protected from inadvertent closure of tailgate 16 on a body part.

However, as pinch strips 120 (and latching mechanism) need to be electrically connected to controller 78, such as by a wiring harness 127, there needs to be a mechanism to permit selective disengagement of wiring harness 127 to permit selective removal of tailgate 16 from vehicle 10. In one embodiment, as shown in FIG. 9, a wiring harness 127 leading from pinch strips 120 (and latching mechanism) that are incorporated on the tailgate 16 are selectively connectable to a first end 128 of a wiring harness connector 130 that is located adjacent tailgate 16. A wiring harness 131 leading to controller 78 is received in a second end 132 of wiring harness connector 130.

To protect wiring harness 127, 131 from potential damage when tailgate 16 moves between an open and closed position, an interior wall 126 of tailgate 16 may be provided with a mounting indentation (not shown) in which harness connector 130 may be positioned. The mounting indentation may further be provided with a thumb groove to permit easy disengagement of wiring harness connection 130 from the mounting indentation. A positioning channel (not shown) that extends from the mounting indentation that is sized to receive wiring harness 131 may also be provided, where the positioning channel extends toward first end 18 of tailgate 16. By providing the mounting indentation and positioning channel, wiring harness connector 130 and wiring 127, 131 may be somewhat protected against damage.

Referring now to FIG. 11, first hinge mechanism 25 is illustrated. Hinge mechanism 25 is positioned in encircled area 11 of FIG. 1 and is not attached to a power assembly, like hinge mechanism 26. Hinge mechanism 25 includes a tailgate bracket 184, a vehicle bracket 186 and a collar 188 that contains a roller bearing (not shown). A driveshaft 190 is fixedly connected to vehicle bracket 186, and extends through collar 188 and through a slotted opening (not shown) formed on collar 188. The slotted opening has a slot area that is only accessible when tailgate 16 is rotated to a predetermined angle. A connection mechanism 192 may be secured to an end of collar 188 to secure collar 188 to tailgate bracket 184. Vehicle bracket 186 is fixedly connected to a portion of vehicle 10 such as wall 14a and tailgate bracket 184 is fixed connected to tailgate 16 in a manner similar to that which was described above in connection with tailgate bracket 28.

To selectively disconnect tailgate 16 from vehicle 10, both first and second hinge mechanisms 25 and 26, respectively, must be disconnected. In one embodiment, the process for removing tailgate 16 from vehicle 10 begins with selectively disconnecting hinge mechanism 25. To disconnect hinge mechanism 25, tailgate 16 first must be opened to a predetermined angle. In one embodiment, the predetermined angle is about 45°. Once tailgate 16 has been rotated to the predetermined angle, tailgate 16 is pulled so as to move driveshaft 190 out of engagement with a slot formed on tailgate bracket 184, thereby releasing driveshaft 190 from tailgate bracket 184, and disconnecting hinge mechanism 25.

Next, hinge mechanism 26 is disconnected to permit removal of tailgate 16 from vehicle 10. After hinge mechanism 25 is disconnected, boss 58 of drive cup 30 may be selectively disengaged from aperture 60 of tailgate bracket 28, simply by pulling tailgate 16 laterally away from hinge mechanism 26. As boss 58 is the only connection point between tailgate bracket 28 and the remainder of hinge mechanism 26, disengaging boss 58 from aperture 60 permits tailgate 16 to be selectively removed from vehicle 10 (and power assembly 24), without using any tools and with relative ease.

In an alternative embodiment, boss 58 may be fixedly secured to tailgate bracket 28 and engagement plug 56 is detachably received within groove 57 of drive cup 30. After hinge mechanism 25 is disengaged, tailgate 16 with drive cup 30 secured thereto is simply pulled away from engagement plug 56.

To reinstall tailgate 16 back on vehicle 10, in one embodiment, boss 58 of drive cup 30 is simply engaged with aperture 60 of tailgate bracket 28. In an alternative embodiment, drive cup 30 is simply fitted over engagement plug 56. In both embodiment, tailgate 16 is then again positioned at the predetermined angle, and driveshaft 190 of hinge mechanism 25 is re-inserted into the slot area and tailgate 16 is pushed so as fully seat driveshaft 190 within collar 188.

Wiring harness 131 is also disconnectable from harness connection 130. Thus, all of the wiring required to power tailgate 16 for both the latching mechanism and any sensors, such as pinch strips 120, will be retained within tailgate 16 when it is removed from vehicle 10.

As described above, power assembly may be activated by switch 115. An example of switch 115 that is positioned within lateral wall 14b is shown in FIG. 10. Switch 115 includes a depressible indent button 178 that is retained within a grommet 180. Connected to indent button 178 is a wiring harness 182. Wiring harness 182 is connected to controller 78. In one embodiment, grommet 180 includes a series of retaining channels 184 that receive a portion of lateral wall 14b. By providing a series of retaining channels 184, multiple set locations for switch 115 are provided. As described above, depressing switch 115 will send a single to controller 78 to activate motor assembly 76 to move tailgate 16 into the open or closed position.

The preceding description has been presented only to illustrate and describe exemplary embodiments of the methods and systems of the claimed invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A selectively removable tailgate assembly for a vehicle, comprising:
    a vehicle having a cargo area including a bed floor, a first side cargo wall disposed on a first lateral side of the bed floor, and a second side cargo wall disposed on a second lateral side of the bed floor, with respective rearward ends of the first and second side cargo walls defining a tailgate opening;
    a tailgate movable between an open position and a closed position relative to the tailgate opening such that in the closed position the tailgate mates with the tailgate opening and the first and second side cargo walls and in the open position the tailgate exposes the cargo area extending the bed floor;
    a hinge mechanism that connects a portion of the tailgate to a lower portion of a rearward end of the first side cargo wall and a lower portion of a rearward end of the first side cargo wall, wherein at least one portion of the hinge mechanism may be selectively detached from another portion of the hinge mechanism to permit the tailgate to be removed from the vehicle;
    a power assembly operatively connected to the tailgate hinge mechanism to selectively move the tailgate at least partially between the open and closed positions; and
    at least one pinch strip connected to at least one of the tailgate and a section of the vehicle proximate the tailgate opening, the pinch strip operative to detect an obstruction when closing the tailgate by the power assembly.

2. The selectively removable tailgate assembly of claim 1, wherein the hinge mechanism comprises:
    a tailgate bracket connected to the tailgate; and
    a clevis fixedly connected to a driveshaft, wherein the power assembly is operatively connected to the clevis to operate the driveshaft; wherein the driveshaft selectively moves the tailgate between the open and closed positions.

3. The selectively removable tailgate assembly of claim 1, further including a tailgate cable having a first end connected to the vehicle and a second end connected to the tailgate; wherein one of the first and second ends is selectively disconnectable to allow removal of the tailgate.

4. The selectively removable tailgate assembly of claim 1, further including a switch located on a portion of the vehicle, wherein the switch is electrically connected to the power assembly and may be activated by a user to operate the power assembly to open and close the tailgate.

5. A selectively removable tailgate assembly, comprising:
    a tailgate movable between an open position and a closed position;
    a hinge mechanism that connects a portion of the tailgate to a portion of the vehicle, wherein at least one portion of the hinge mechanism may be selectively detached from another portion of the hinge mechanism to permit the tailgate to be removed from the vehicle;
    a power assembly operatively connected to the tailgate hinge mechanism to selectively move the tailgate at least partially between the open and closed positions; and
    at least one pinch strip connected to the tailgate, the pinch strip operative to detect an obstruction when closing the tailgate by the power assembly.

6. The selectively removable tailgate assembly of claim 1, wherein
    the tailgate and the hinge mechanism are configured such that the tailgate is removed from the vehicle and re-installed to the vehicle without tools.

7. The selectively removable tailgate assembly of claim 1, wherein
    the tailgate pivots about a pivot axis that is defined by the hinge mechanism, the tailgate having a first end parallel and adjacent to the pivot axis, a second end opposite the first end, a first contact surface defined along a first lateral side that extends between the first and second ends of the tailgate and a second contact surface defined along a second lateral side that extends between the first and second ends of the tailgate with the pinch strip being disposed along at least one of the first and second contact surfaces.

8. The selectively removable tailgate assembly of claim 7, wherein
    an additional pinch strip is disposed along the other of the first and second contact surfaces.

9. The selectively removable tailgate assembly of claim 1, wherein
    the pinch strip is disposed along at least one of the rearward end of the first side cargo wall and the rearward end of the second side cargo wall of the cargo area of the vehicle.

10. The selectively removable tailgate assembly of claim 9, wherein
    an additional pinch strip is disposed along a rearward end of the bed floor of the cargo area of the vehicle adjacent to the tailgate.

11. The selectively removable tailgate assembly of claim 1, wherein
    the pinch strip is disposed along a rearward end of the bed floor of the cargo area of the vehicle adjacent to the tailgate.

12. The selectively removable tailgate assembly of claim 1, wherein
    the at least one pinch strip is in electrical communication with the power assembly such that with the power assembly activated to move the tailgate between the open and closed positions, the power assembly stops movement of the tailgate in response to detection of an obstruction by the pinch strip.

13. The selectively removable tailgate assembly of claim 1, wherein
    with the power assembly activated to move the tailgate between the open position and the closed position, the power assembly automatically returns the tailgate to the open position in response to detection of an obstruction by the pinch strip.

14. The selectively removable tailgate assembly of claim 5, wherein
the tailgate and the hinge mechanism are configured such that the tailgate is removed from the vehicle and re-installed to the vehicle without tools.

15. The selectively removable tailgate assembly of claim 5, wherein
the tailgate pivots about a pivot axis that is defined by the hinge mechanism, the tailgate having a first end parallel and adjacent to the pivot axis, a second end opposite the first end, a first contact surface defined along a first lateral side that extends between the first and second ends of the tailgate and a second contact surface defined along a second lateral side that extends between the first and second ends of the tailgate with the pinch strip being disposed along at least one of the first and second contact surfaces.

16. The selectively removable tailgate assembly of claim 15, wherein
an additional pinch strip is disposed along the other of the first and second contact surfaces.

17. The selectively removable tailgate assembly of claim 5, wherein
the vehicle has a cargo area including a bed floor, a first side cargo wall disposed on a first lateral side of the bed floor, and a second side cargo wall disposed on a second lateral side of the bed floor, with respective rearward ends of the first and second side cargo walls defining a tailgate opening such that in the closed position the tailgate mates with the tailgate opening and the first and second side cargo walls and in the open position the tailgate exposes the cargo area extending the bed floor, and
an additional pinch strip is disposed along surfaces at least one of the rearward ends of the first and second lateral sides of the bed floor.

18. The selectively removable tailgate assembly of claim 17, wherein
another additional pinch strip is disposed along a rearward end of the bed floor of the cargo area of the vehicle adjacent to the tailgate.

19. The selectively removable tailgate assembly of claim 5, wherein
the at least one pinch strip is in electrical communication with the power assembly such that with the power assembly activated to move the tailgate between the open and closed positions, the power assembly stops movement of the tailgate in response to detection of an obstruction by the pinch strip.

20. The selectively removable tailgate assembly of claim 5, wherein
with the power assembly activated to move the tailgate between the open position and the closed position, the power assembly automatically returns the tailgate to the open position in response to detection of an obstruction by the pinch strip.

\* \* \* \* \*